UNITED STATES PATENT OFFICE.

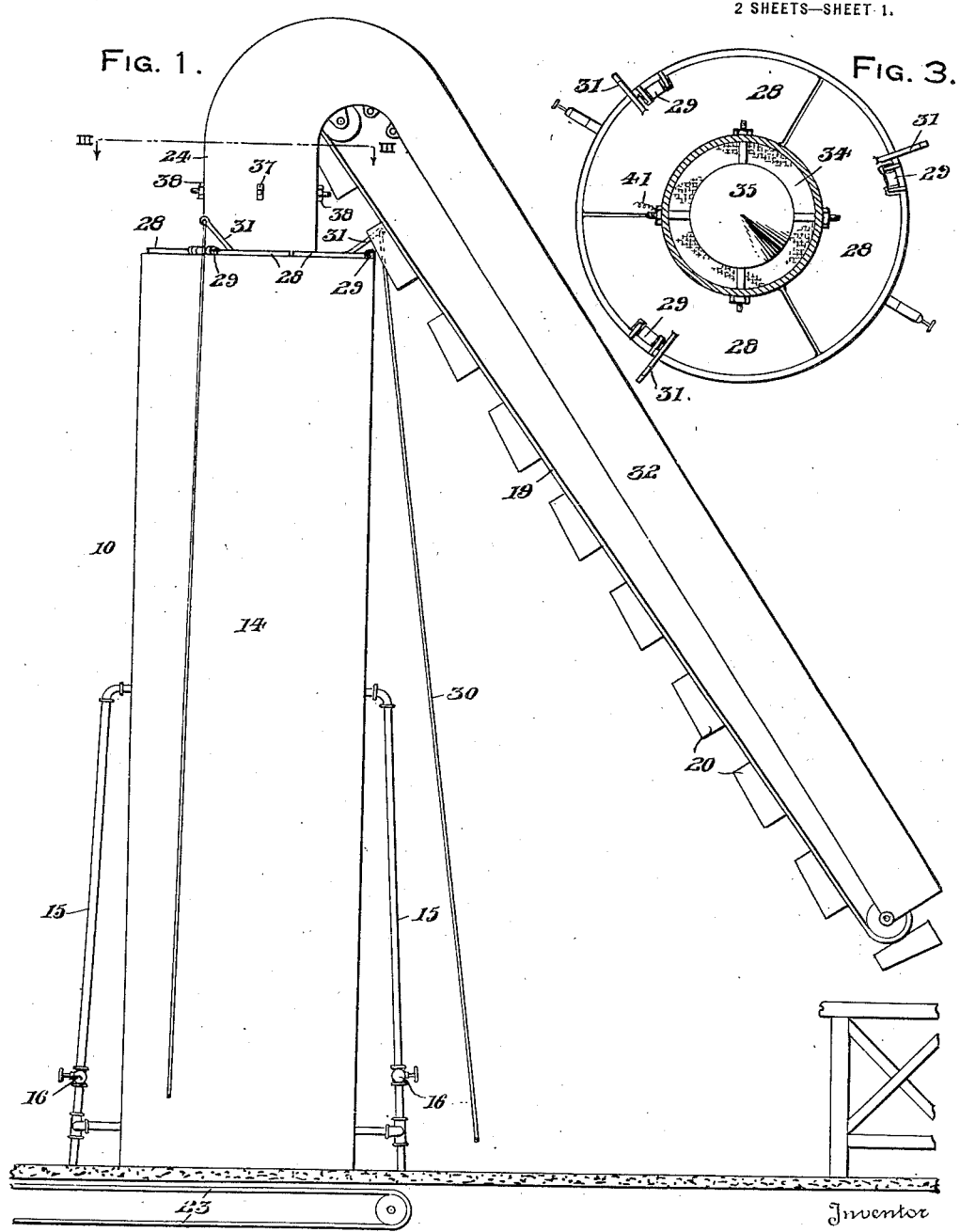

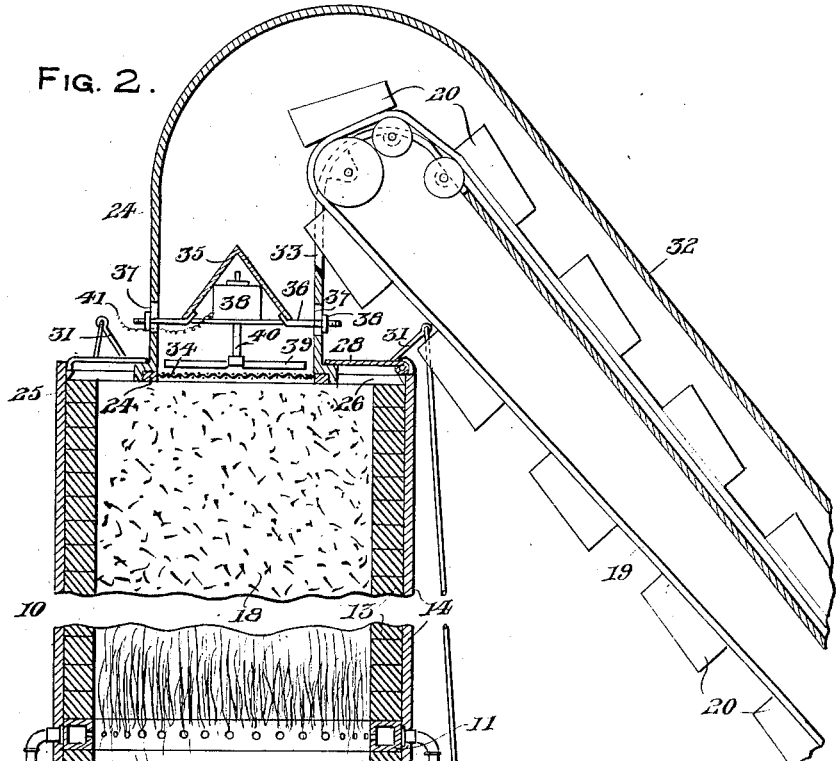
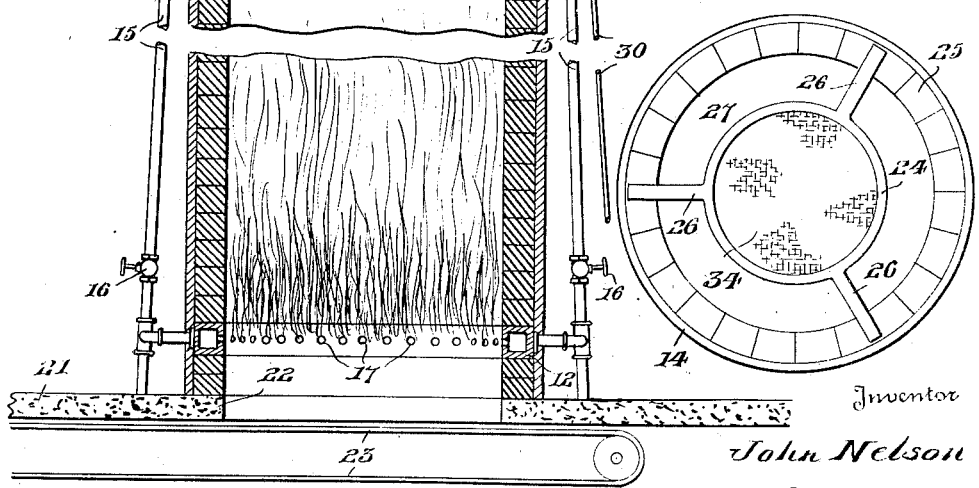

JOHN NELSON, OF OTTAWA, KANSAS.

PORTLAND-CEMENT AND CALCINING KILN.

1,366,585.  Specification of Letters Patent.  Patented Jan. 25, 1921.

Application filed July 19, 1919. Serial No. 312,022.

*To all whom it may concern:*

Be it known that I, JOHN NELSON, a citizen of the United States of America, residing at Ottawa, in the county of Franklin and State of Kansas, have invented certain new and useful Improvements in Portland-Cement and Calcining Kilns, of which the following is a specification.

The primary object of my invention is to provide a method of manufacture for Portland cement whereby the cost is greatly reduced by the elimination of expensive machinery ordinarily employed, the method requiring but little apparatus for carrying into practice and adaptable for either the dry or wet process of cement manufacture.

The present day apparatus for making Portland cement includes rotary kilns whereby the cement ingredients are formed into nuggets requiring subsequent grinding and my method eliminates the rotary kilns by calcining directly the pulverized cement ingredients. In this manner, less heating expense is required and twice the amount of ingredients may be calcined in a given time than is possible by the old method thereby reducing the cost of Portland cement as a product of commerce substantially fifty per cent.

Broadly considered therefore my invention is a method of passing the ingredients for making Portland cement in powdered form into direct contact with fire, through white heat, whereby such ingredients are calcined or burned directly into cement ready for immediate use, the intensity of the heat reducing and eliminating all organic matter from the ingredients.

The wide extent of use for Portland cement being well known and constantly increasing, and any appreciable reduction in the expense of its manufacture from lime rock and slate or similar ingredients, varying in different localities, would appeal to the expert in this art as a marked step in advance, giving considerable advantage to a cement manufacturer who is carrying out my method of the direct calcining of cement ingredients.

While different forms of apparatus may be devised for carrying out my method of manufacturing Portland cement, one form of apparatus is herein illustrated by way of example, and the same is believed to be a preferred embodiment thereof although changes may be made therein without departing from the spirit and scope of my said invention.

In the drawings forming a part of this application like reference characters designate corresponding parts throughout the several views and in which, Figure 1 is an elevational view of the invention embodied in an apparatus for carrying out the method.

Fig. 2 is a central vertical sectional view thereof.

Fig. 3 is a transverse horizontal sectional view taken upon line III—III of Fig. 1 upon a slightly enlarged scale and Fig. 4 is a top plan view thereof with parts removed.

My method consists in taking the pulverized ingredients for making Portland cement and sprinkling or sifting the pulverulent material into and through an upright kiln brought to a white heat and calcining the said ingredients during their downward fall in particle formation through the kiln.

More specifically, my method may provide gas rings 11 and 12 in the brick work or refractory lining 13 of the kiln 10 having an outer casing or jacket 14 of metal such as steel, said rings being supplied with combustible gas through pipes 15 controlled by valves 16, the gas being ignited at the openings or jets 17 in the rings 11 and 12 and bursting into flame filling the interior of the kiln 10 to a height above the upper ring 11. The lining 13 is brought to a white heat which taken with the column of flame within the kiln quickly reduces or burns out all organic matter in the pulverized lime rock or cement ingredients 18 fed into the top of the kiln 10. An endless belt conveyer 19 having buckets 20 may elevate and dump the ingredients substantially centrally into the top of the kiln so that such elevating and depositing of the powdered ingredients in the upright kiln heated to a white heat by gas rings under suitable control further constitutes my method of manufacturing Portland cement.

The kiln 10 has somewhat the form of a shaft furnace of the continuous type, calcination being continued for any desired period, the fresh material or ingredients being fed into the top thereof without loss of time or waste of heat, the employment of natural gas, generator gas or oil rendering the operation cleanly with a regularity of temperature. The kiln 10 has a suitable base 21 with an opening 22 for the full diameter of the interior dimensions of the kiln whereby the calcined product readily drops therethrough upon the endless belt or conveyer 23 for transfer to any distant point desired, being easily and quickly cooled and then ready for immediate use or shipment.

This form of kiln 10 has a cylindrical metal stack 24 mounted upon the top 25 thereof by radial arms 26 providing arcuate draft openings 27 with lids or dampers 28 attached by hinges 29 to the upper edge of the metal jacket 14. The up-draft through the kiln 10 is regulated by operating the dampers 28 through the agency of descending rods 30 pivoted to brackets 31 upon said damper 28, air being freely admitted into the bottom of the kiln 10 through the opening 22 or any other suitable arrangement. The up-going portion of the conveyer 19 passes through a tubular member or conduit 32, enlarging into the stack 24 whereby the filled buckets are successively dumped into the stack for feeding to the kiln, the empty buckets 20 descending through an opening 33 in the side of the stack 24. The ingredients for making the Portland cement are pulverized before being taken up by the conveyer 19 such operation being accomplished in any manner such as by grinding in the Griffin mill.

A screen or sieve 34 within the lower inner end of the stack 24 receives the pulverized ingredients which are agitated thereon so as to pass evenly therethrough in a descending shower or mist of the ingredient particles. An inverted cone 35 is adjustably mounted in the stack 24 by means of arms 36 upon the cone positioned through vertical slots 37 in the stack 24, said arms 36 and cone being retained in their adjusted position by lock nuts 38 threaded upon the arms 36 exteriorly of the stack 24. An electric motor 38 secured within the cone 35 and protected thereby has a suitably shaped fan or blade 39 upon its power shaft 40 positioned adjacent the upper side of the screen 34 for evenly distributing the pulverized material upon the screen and imparting sufficient agitation thereto for evenly sifting the ingredients through the screen 34 for descent through the kiln 10. Electrical circuit wires 41 for the motor 38 may follow one of the arms 36 through the adjacent slot 37 of the stack 24 to any convenient point for turning on and off the motor as well as regulating the speed of the agitator 39.

The carrying out of the various operations of the apparatus described constitute further possible limitations of one form of my method but my invention is not limited thereto but broadly consists of the direct calcination of ingredients into cement. The reduction in cost of production by my method would be true regardless of the form of apparatus employed and while the upright kiln is believed preferable as well as the various other elements of construction herein noted my invention is not confined thereto. The even distribution of the ingredients upon the screen 34 for even feeding therethrough such as by the agitation of the fan 39 is an important factor in carrying my method to perfection. The upper gas ring 11 is only auxiliary to the main lower ring 12 and may be dispensed with if desired while additional gas rings may be added if greater heat is required or the height of the stack 10 warrants such addition. The cone 35 prevents the ingredients from interfering with the operation of the motor 38 and the ingredients may be deposited directly into the stack 24, upon and around the cone 35 in any other manner than that herein shown as the circumstances of the installation may warrant.

What I claim as new is—

1. An apparatus for the manufacture of cement comprising an upright furnace, gas rings in the furnace adapted for heating the interior thereof, a stack upon the open top of the furnace adapted for the deposit of pulverized ingredients therein, a screen across the bottom of said stack, an electric motor vertically adjustably secured within said stack, an agitating and distributing blade for the ingredients carried by the shaft of the motor above said screen whereby the ingredients are evenly fed through the latter for descent by gravity through the heat zone of the kiln whereby the ingredients are calcined into cement.

2. A cement manufacturing apparatus comprising an upright kiln, heating means for the kiln, a stack centrally mounted upon the top of the kiln spaced from the sides thereof forming draft openings, adjustable arcuate dampers carried by the sides of the kiln adjustable relatively of said openings, deposit means for ingredients adapted for emptying into said stack, a screen in the bottom of the stack, a cone vertically adjustable within said stack, an electric motor within said cone and an agitating blade upon the power shaft of the motor positioned adjacent said screen and adjustable relatively thereof during the adjustment of the cone and conveying means for the product positioned beneath the kiln.

3. Apparatus of the class described comprising an upright kiln, heating means associated therewith, a stack upon the top of the kiln, means for feeding material to the stack, agitating means for the material in the path of the material delivered to the stack, an electric motor adjustably mounted in the stack and carrying the agitating means, and a conical hood overlying the motor.

In testimony whereof I affix my signature.

JOHN NELSON.